(12) United States Patent
Schaeferling et al.

(10) Patent No.: US 9,796,031 B2
(45) Date of Patent: Oct. 24, 2017

(54) METHOD FOR MACHINING TOOTHED WORKPIECES, MACHINING UNIT THEREFOR AND MACHINE TOOL EQUIPPED WITH SUCH A MACHINING UNIT

(71) Applicant: THE GLEASON WORKS, Rochester, NY (US)

(72) Inventors: Karl Schaeferling, Unterschleissheim (DE); Uwe Gampe, Ottobrunn (DE); Thomas Lang, Germering (DE)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 14/775,056

(22) PCT Filed: Feb. 20, 2014

(86) PCT No.: PCT/IB2014/000454
§ 371 (c)(1),
(2) Date: Sep. 11, 2015

(87) PCT Pub. No.: WO2014/140785
PCT Pub. Date: Sep. 18, 2014

(65) Prior Publication Data
US 2016/0031023 A1    Feb. 4, 2016

(30) Foreign Application Priority Data
Mar. 13, 2013    (DE) .......................... 10 2013 004 397

(51) Int. Cl.
 B23F 19/10        (2006.01)
 B23F 21/12        (2006.01)
 B23F 23/00        (2006.01)

(52) U.S. Cl.
 CPC .............. *B23F 19/10* (2013.01); *B23F 21/12* (2013.01); *B23F 23/006* (2013.01); *B23F 19/102* (2013.01)

(58) Field of Classification Search
 CPC ...... B23F 19/10; B23F 19/102; B23F 23/006; B23F 21/12; Y10T 409/10795
 See application file for complete search history.

(56) References Cited

U.S. PATENT DOCUMENTS

| 4,412,765 A | 11/1983 | Occhialini |
| 2010/0273400 A1 | 10/2010 | Schaeferling et al. |

FOREIGN PATENT DOCUMENTS

| DE | 8328237 U1 | 7/1984 |
| DE | 102009018405 A1 | 10/2010 |
| DE | 102011050524 A1 | 11/2012 |

OTHER PUBLICATIONS

International Search Report and Written Opinion for PCT/IB2014/000454, ISA/EPO, dated Nov. 25, 2014, 10 pages, with English translation (9 pages).

*Primary Examiner* — Alan Snyder
(74) *Attorney, Agent, or Firm* — Robert L. McDowell

(57) ABSTRACT

The invention concerns a method for the machining of toothed workpieces, in particular for the plastic reshaping of the tooth edges at the ends of the teeth through a meshing tooth engagement with a tool that is rotatable with free-running mobility about its axis of rotation, in particular a chamfering tool, wherein between the machining of one workpiece and the next, the tool is subjected to a traverse movement, whereby the tool is caused to perform a rotary movement so that, if a tool region (6a, 6b) that is designed for the initial engagement with the work pieces is not suitably positioned, it is brought into a position that is suitable for the machining of the next work piece, wherein (Continued)

the rotary movement is effected by coupling the rotary movement at least in sections to the traverse movement.

13 Claims, 6 Drawing Sheets

METHOD FOR MACHINING TOOTHED WORKPIECES, MACHINING UNIT THEREFOR AND MACHINE TOOL EQUIPPED WITH SUCH A MACHINING UNIT

The invention concerns a method for the machining of toothed workpieces, in particular for generating a chamfer on the tooth edges at the ends of the teeth, through a meshing tooth engagement with a tool that is rotatable with free-running mobility about its axis of rotation, in particular a chamfering tool, wherein between the machining of one workpiece and the next, the tool is subjected to a traverse movement. In addition, the invention also concerns a machining unit and a machine tool with the requisite capability to perform the method.

A state-of-the-art process of generating gear teeth, for example by bobbing, normally includes a machining operation on the end-facing tooth edges which, for known reasons, is of advantage, as described for example in DE 10 2009 018 405 A1.

Reference is hereby made to this publication concerning the details of reworking the end-facing tooth edges into a chamfer that connects an end surface and a tooth flank of a gear tooth.

However, experience with methods of the aforementioned kind has shown that the machining of the tooth edges can cause unintended damage to the gear teeth of the workpiece.

The invention therefore has the objective to propose a method that satisfies the need for higher quality and which can in particular be performed without adding to the process time.

From a method-oriented point of view, this task is solved by a further development of the method of the kind mentioned above which in essence is distinguished by the feature that the tool is caused to perform a rotary movement whereby, if a region of the tool that is designed for the initial engagement with the work pieces is not suitably positioned, it is brought into a position that is suitable for the machining of the next work piece.

The invention is based on the observation that due to the free-running mobility of the tool, the position of the latter in relation to the next following workpiece to be processed does not necessarily correspond to a desired rotary position, so that even if the tool has regions designed for the initial engagement with the workpieces, a complete damage-free entrainment of the free-running tool does not always succeed, in particular if the workpiece is running at higher rpm-rates during the initial engagement.

In such cases, unintended sharp strikes of the tool against the workpiece may occur, whereby the workpiece can get damaged, as has been mentioned above. It has further been learned that even in cases where a certain proportion of rejected parts has to be expected, the scrap ratio can be reduced to a near-zero level by the inventive measures directed towards this goal.

Due to the rotary movement of the tool, the initial engagement can be performed without damaging the workpiece even if the rotation of the latter is not excessively slow, as the tool is in the correct position for the initial engagement.

According to a preferred concept, the rotary movement is effected through a relative movement between the tool and a counterpart that is configured in particular as a guide arrangement. It would thus be possible to design a version of the method where the rotary movement takes place independently of the traverse movement of the tool.

However, according to a particularly preferred realization of the method, the rotary movement is to be effected by coupling the rotary movement at least in sections to the traverse movement. With the rotary movement depending on the traverse movement since the two movements are coupled to each other at least in sections, the tool region designed for the initial engagement with the work pieces can be suitably positioned in a particularly simple manner.

The method takes effect if the rotary position is not suitable for the initial engagement, which is normally the case. However, it may happen occasionally that the rotary position is already correct, in which case the angle of the rotary movement is zero.

In a preferred form of the method, the traverse movement takes place along a closed-loop path. This allows the machining of a workpiece and the next following workpiece to be performed at the same machining location.

With preference, the coupling engagement takes place before a turning point of the closed-loop path. This allows the traverse movements to be short, so that less space is required.

In a particularly preferred embodiment, the coupling function is mechanical, in particular purely mechanical. This results in a particularly simple and failsafe coupling action, all the more so if, according to an even more preferred embodiment, the side of the coupling that does not belong to the tool has no movable parts.

In regard to the coupling, it is preferred if for the engagement of the coupling, a coupling part on the side of the tool is guided by the stationary side of the coupling. This is likewise conducive to simple design configurations of the coupling.

In a practical implementation of the method, a design can be chosen where the tool region that serves for the initial engagement is not continuous and comprises for example two sub-regions that are offset against each other by 180°. The angle does not have to be precisely 180°, it is only important that the sub-regions lie opposite each other. This provides more freedom for the design of the stationary side of the coupling. However, with this design choice, the portion of the tool that remains available for the actual machining is reduced in comparison to a design with only one initial-engagement region.

The region/sub-region of the tool designed for the initial engagement can include a plurality of gear teeth. This allows wider tolerances for the positioning, and the workpiece does not have to be slowed down to excessively low rpm-rates for the initial engagement. Regarding the rate of rotation, it is envisioned that if the workpiece is rotating during the initial engagement, the area of engagement will have a velocity not higher than 360 m/min, preferably not higher than 180 m/min, in particular not higher than 120 m/min, and preferably at least 6 m/min, in particular at least 30 m/min. Alternatively, the initial engagement can also take place in a quasi-stationary state of the workpiece, i.e. at a velocity of the engagement area of the workpiece of less than 1 m/min, for example in an order of magnitude of 30 cm/min, in order to obtain even smoother initial engagements.

In one embodiment it is envisioned that the tool region/sub-region designed for the initial engagement comprises one tooth. In this case, one would perform the initial engagement with point-positioning of the tool while the workpiece is not rotating, meaning that the workpiece would be set into rotation only after the initial engagement has been completed, so that the initial engagement region has been brought into meshing engagement with the teeth of the workpiece.

In a preferred implementation of the method, a coupling part associated with the side of the tool, if it is not already lying closer to the workpiece axis than a plane that is orthogonal to the path of the traverse movement and contains or intersects the tool axis, is moved there, so as to be located closer to the workpiece axis. This move occurs in particular automatically and also in particular by purely mechanical means. With this concept, the region for the initial engagement does not have to be split up into two sub-regions and can therefore be designed smaller.

In a particularly preferred implementation of the method, it is envisioned that for a part of the possible angular starting positions of the tool, a reversal of direction takes place in a movement component of the coupling part that belongs to the side of the tool and is directed at a right angle to the path of the traverse movement. This allows the coupling to be accommodated within a smaller design space.

From a device-oriented point of view, the invention provides a machining unit for the machining of toothed workpieces, in particular for generating a chamfer on the tooth edges at the ends of the teeth. The machining unit includes rotary bearings supporting a tool that can be brought into tooth-meshing engagement with a workpiece, in particular a chamfering tool, with free-running rotary mobility about its axis of rotation, and further includes a movement device, whereby the tool supported by the rotary bearings can be caused to perform a traverse movement relative to a stationary part of the machining unit between machining one workpiece and machining a next workpiece. In essence, the machining unit is distinguished by having a functional counterpart, in particular a coupling device whose position relative to the position of the tool is changeable and which has the purpose, if a region of the tool that is intended for the initial engagement with the work pieces is not suitably positioned, to bring said region into a position that is suitable for the machining of the next work piece.

The advantages of the machining unit according to the invention follow from the advantages of the method as described above.

Accordingly, the machining unit can in particular be designed so that the portion of the coupling device that belongs to the tool has a coupling part which is in particular of a pin-like configuration and whose pin axis can extend for example parallel to the tool axis. The coupling part on the side of the tool can be arranged in the azimuthal sector of the tool regions that are designed for the initial engagement with the workpieces, preferably centered, but a position of the coupling part that is slightly offset from the center will be sufficient.

The portion of the coupling device that belongs to the stationary side can include a template which guides the movement of the coupling part that is associated with the side of the tool. The template can have a guide slot whose transverse dimension is matched to the coupling part that belongs to the tool, with a funnel-shaped section adjoining the guide slot on the side that faces towards the workpiece. Thus, the guide slot can define the end position of the tool in a simple and precise manner. In relation to the tool axis, the coupling part associated with the stationary side can lie above, but alternatively also below, the tool, with the coupling part of the tool being accordingly aligned upward or downward of the tool. These directions are referenced to a vertical rotary axis of the tool, but have to be understood in a more general sense if the rotary axis of the tool is oriented differently.

It can in particular be envisioned that, adjacent to the funnel-shaped section, the template further includes a section that lies to the outside of the funnel entrance and has in particular a wing-shaped configuration. Thus, the funnel-shaped section does not continuously come nearer to the tool.

Rather, the outer part of the guide surface is folded back, figuratively speaking, which allows the template to be accommodated within a smaller design envelope.

Also covered within the invention is a machine tool, in particular a bobbing machine, with a machining unit in accordance with one of the foregoing concepts. Also covered is a chamfering tool with a region that is designed primarily for the initial engagement with a toothed workpiece, wherein said region is not continuous and includes in particular two sub-regions located opposite each other, in particular offset by 180° against each other.

Further distinguishing features, details and advantages of the invention will become evident from the following description which refers to the attached drawings, wherein FIG. 1 represents a schematic abstraction of a machine tool, FIGS. 2a, 2b schematically illustrate a coupling part associated with the tool, as well as the tool itself;

Figure 1:
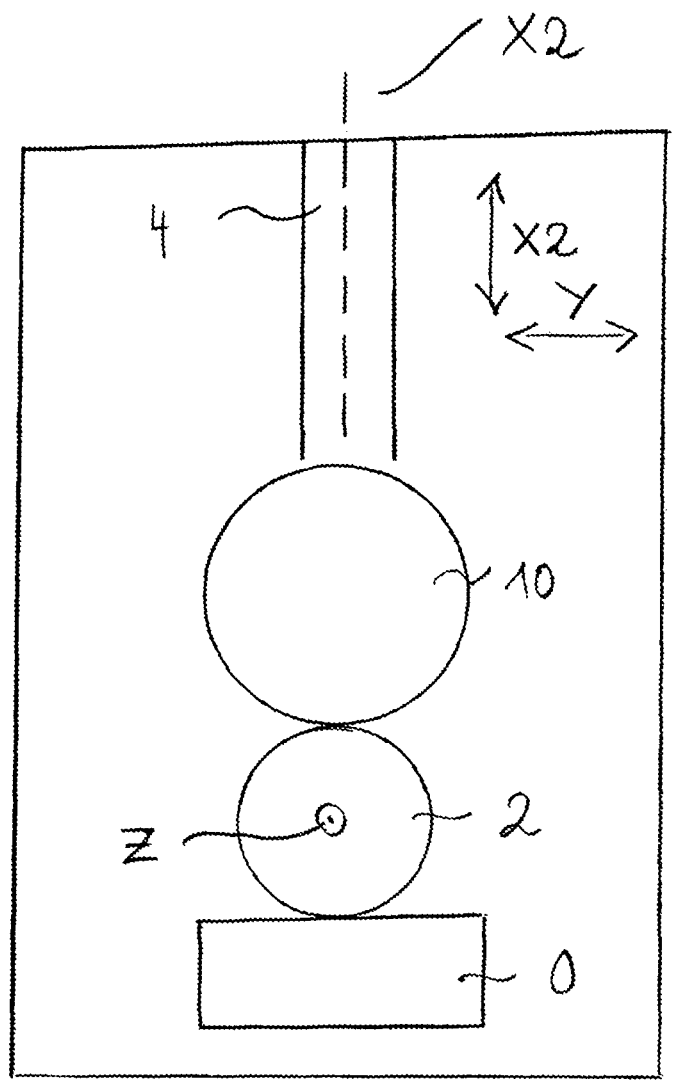

In a simplified schematic view from above, FIG. 1 represents selected portions of a machine tool 20 which are sufficient for an understanding of the invention. The machine tool 20 in this embodiment is a hobbing machine whose principal design structure is known and will not be further explained herein. All that is shown in FIG. 1 is the hobbing tool (the hob 0), whose mobility is defined by the conventional movement axes required for the machining of gear teeth on a blank that is mounted on the workpiece spindle in the production of a toothed workpiece 2. In the representation of FIG. 1, the workpiece axis Z is oriented orthogonal to the plane of the drawing.

In this example, a chamfering tool 10 which can perform a traverse movement along the movement axis X2 is arranged on the side of the workpiece 2 that is diametrically opposite the hob 0. However, the movement axis X2 of the chamfering tool could also be oriented at an angle relative to the axis that connects the workpiece with the primary tool, for example a hob. The latter arrangement is used to chamfer the edges at the tooth ends of the toothed work piece 2 and, depending on the configuration of the chamfering tool, to remove secondary burrs which may result from the chamfering operation.

The movement mechanism which serves to perform the traverse movement of the chamfering tool 10 in order to bring it into and out of the meshing engagement with the work piece 2 is identified in its entirety by the reference symbol 4. It should be noted here that the path along which the chamfering tool 10 can be moved is not limited to an elementary linear displacement axis X2 as shown here for the purpose of illustrating the basic concept, but can generally have a form which includes not only components in the X2/Y-plane, but also components in the Z-direction. Likewise not shown in FIG. 1 is a workpiece changer which is likewise part of the actual machine tool and could for example be arranged to the side of the chamfering tool 10, designed for alternating action with the chamfering tool 10 in a layout that is known per se.

Machine tools 20 as well as chamfering units as described up to this point belong to the known state of the art.

Figure 2:
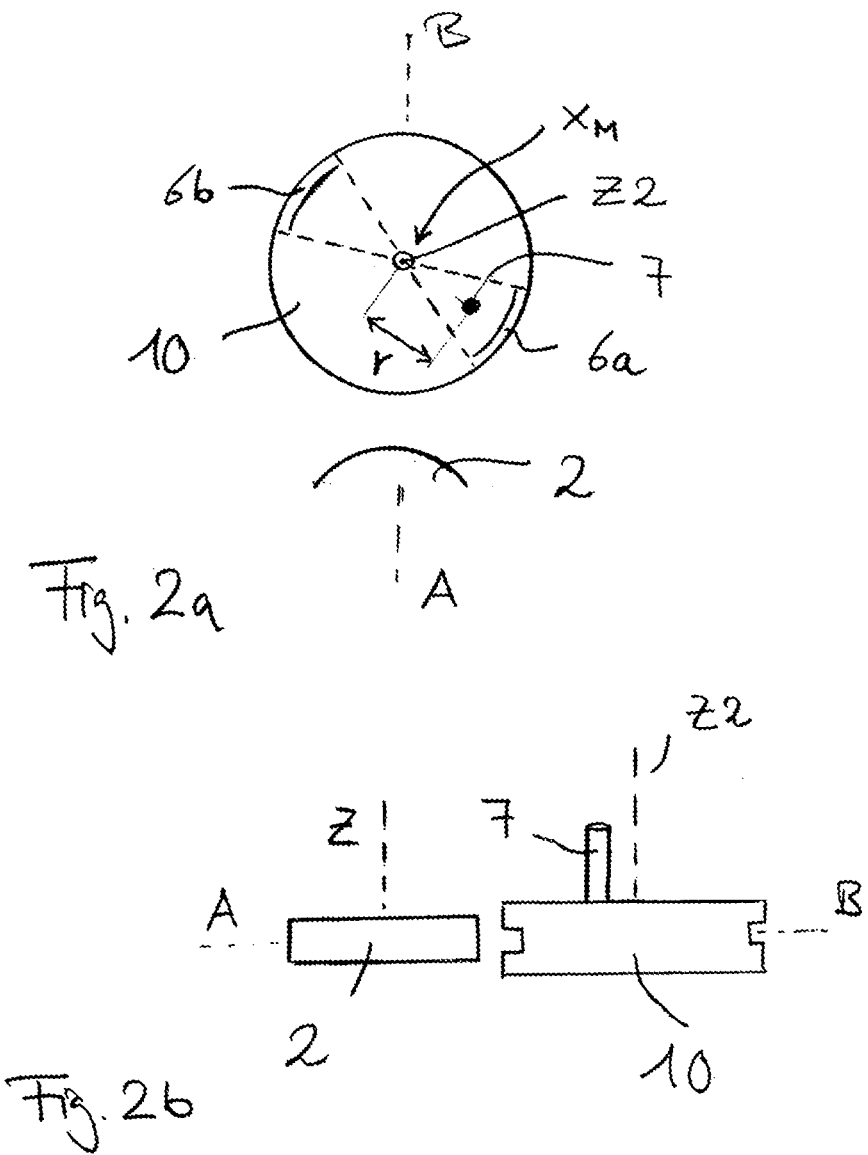

FIG. 2*a*, in an enlarged view of parts of FIG. 1, illustrates additional features of the chamfering tool 10. The drawing shows the center of rotation $X_M$ of the chamfering tool 10 which is rotatable about the axis Z2. However, the axis Z2 does not represent a driven machine shaft but a shaft that is supported with free-running rotary mobility. As is also indicated in FIG. 2*a*, the chamfering tool 10 in this example has two sectors 6*a* and 6*b*. The teeth of the chamfering tool 10 within these sectors are not designed for the machining of the workpiece, but for the smooth initial engagement with the teeth of the workpiece 2, so as not to cause damage to the latter, until the driven workpiece spindle has taken the free-running chamfering tool 10 along in meshing engagement at the desired rpm-rates.

The chamfering tool in this example has two sectors 6*a* and 6*b* of this kind which are located diametrically opposite each other so that, in regard to the two sectors, the chamfering tool 10 is rotationally symmetric relative to a 180° rotation about the axis Z2.

Figure 3:
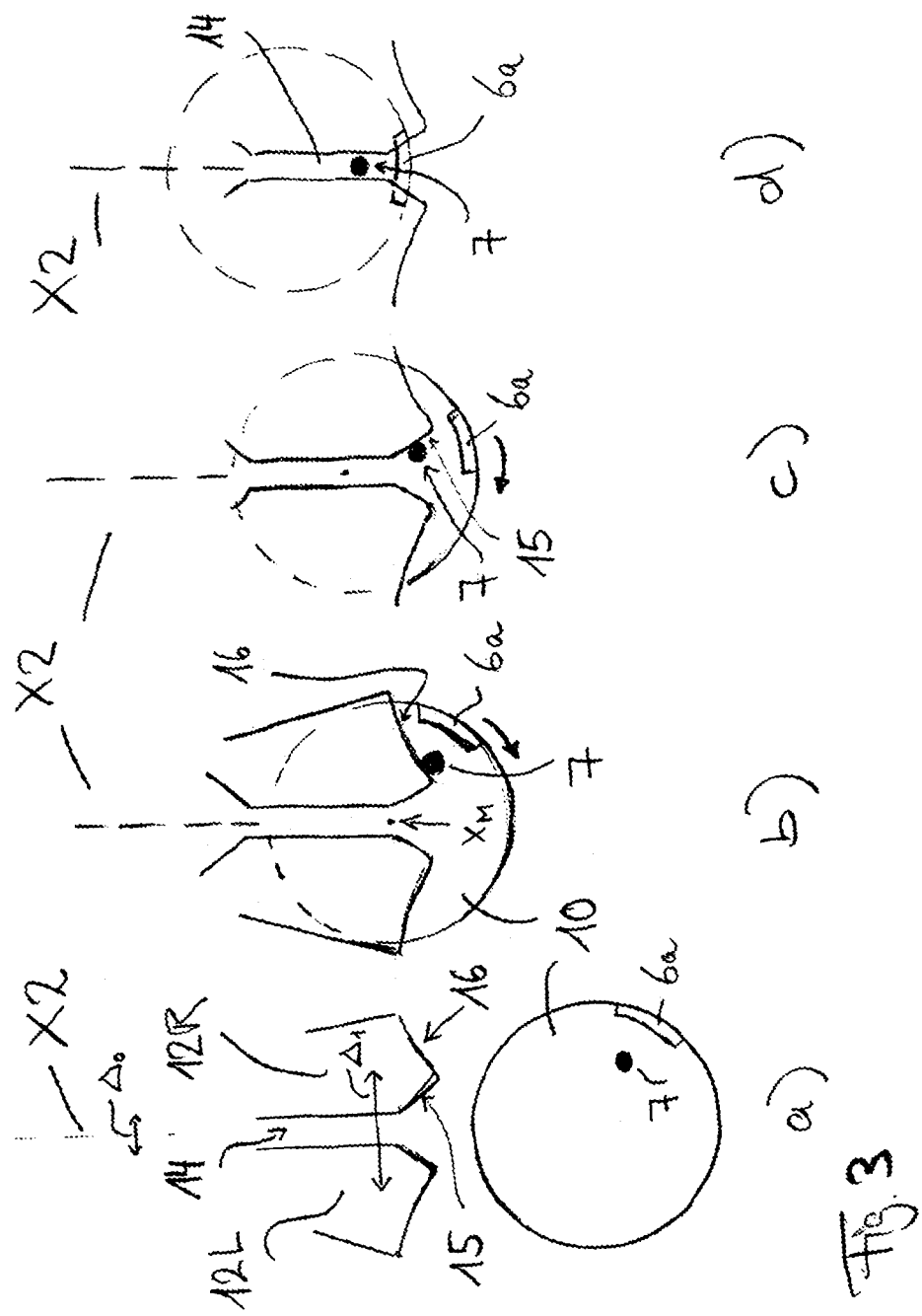
FIGS. 3a to 3d show a time sequence of the coupling process between tool-associated and stationary coupling parts.

Furthermore, the chamfering tool 10 carries a pin 7 projecting parallel to the rotary axis Z2, as can be seen more clearly in FIG. 2*b*. The central axis of the pin 7 is located at a distance r from the center of rotation $X_M$ of the chamfering tool 10. In regard to the azimuthal position, the center of the pin is located at the center of one of the sectors, in this case of the sector 6*a*. As has already been explained above, a position that is slightly offset from the center is also possible as an alternative. The pin forms a tool-connected coupling part for the coupling device 7, 12 that will be further explained with references to FIG. 3.

In FIG. 3*a*, the chamfering tool 10 is shown in the same rotary position as in FIG. 2*a*. The rotary position of the chamfering tool 10 is defined through the position of the pin 7 relative to the spatially fixed X2/Y-coordinate system. As the chamfering tool 10 is rotatable with free-running mobility about the axis Z2, it will at first have a random rotational orientation after its disengagement from the workpiece 2 and after coasting to rest. The position shown in FIG. 3*a* can serve as an example for the further explanation.

The drawing further shows a template 12 which, for the purpose of illustrating the concept, is shown in the drawing plane of FIG. 3*a*, but is actually arranged out of the drawing plane so as to be located entirely above the chamfering tool 10 but still within the height of the pin 7. Relative to the X2/Y-coordinate system, the template 12 is arranged so that its left half 12L and its right half 12R define a slot 14 that is centered on the axis X2 and whose width essentially matches the diameter of the pin 7. This means that the pin 7 is guided in the slot 14 with enough free play to avoid jamming, but with no freedom of azimuthal mobility. In an anterior section, the slot 14 opens up to a width $\Delta_1$ towards the chamfering tool 10 in the manner of a funnel. In this example the width $\Delta_1$ is about three times as large as the width $\Delta_0$ and is of the same order of magnitude as r. The arrangement of the template 12 and the pin 7 could of course be replaced by its mirror image relative to the plane of rotation of the tool, i.e. with a template that lies below the chamfering tool 10 and a pin projecting to the side of the template.

In the Y-direction beyond $\Delta_1/2$, the funnel contour 15 is not continued, but the template recedes, resembling the shape of a wing. The illustrated configuration of the template with the funnel section 15 and the wing-like section 16 thus takes up only a small amount of space.

The template 12 forms a stationary coupling part which is designed entirely without moving parts and whose function is explained in the following.

As can be seen already in FIG. 3*a*, a further retraction of the chamfering tool 10 in the direction of the axis X2 by means of the movement mechanism 4 will bring the pin 7 into contact with the wing-like section 16 of the right half 12R of the template. This is illustrated as a snapshot in FIG. 3*b*, where the center of rotation $X_M$ has already moved into the area of the slot 14 where the latter has narrowed to the width $\Delta_0$.

Due to the coupling between the right half 12R of the template and the pin 7, a further retreat of the chamfering tool 10 in the direction X2 will cause a clockwise rotation of the chamfering tool. Guided at first by the wing-like section 16, the pin 7 follows this course of movement because of its fixed constraint to the center of rotation $X_M$, proceeding into the funnel-shaped section 15 (FIG. 3*c*), and ending up in the slot 14 (FIG. 3*d*), where the pin 7 is brought into alignment on the axis X2. As is apparent from FIG. 3*d*, the sector 6*a* is now suitably positioned for an initial engagement with the next workpiece 2. If the movement mechanism now advances the chamfering tool 10 towards the next workpiece 2, the engagement between chamfering tool 10 and workpiece 2 succeeds without the risk of damage even at comparatively high rpm-rates of the workpiece. The machining with the chamfering tool 10 can at this point be continued in the normal manner.

Obviously, a starting situation with the pin 7 in a mirror-symmetric position relative to the axis X2 would have led to a coupling of the pin 7 with the left half 12L of the template which would have caused a counterclockwise rotation of the chamfering tool 10, with the latter again ending up in the same position as shown in FIG. 3*d*. It is further evident that if in a random position of the tool the pin 7 happens to lie on the axis X2, the coupling is not needed and is also not brought into action, since the tool is already in a suitable orientation.

Figure 4:
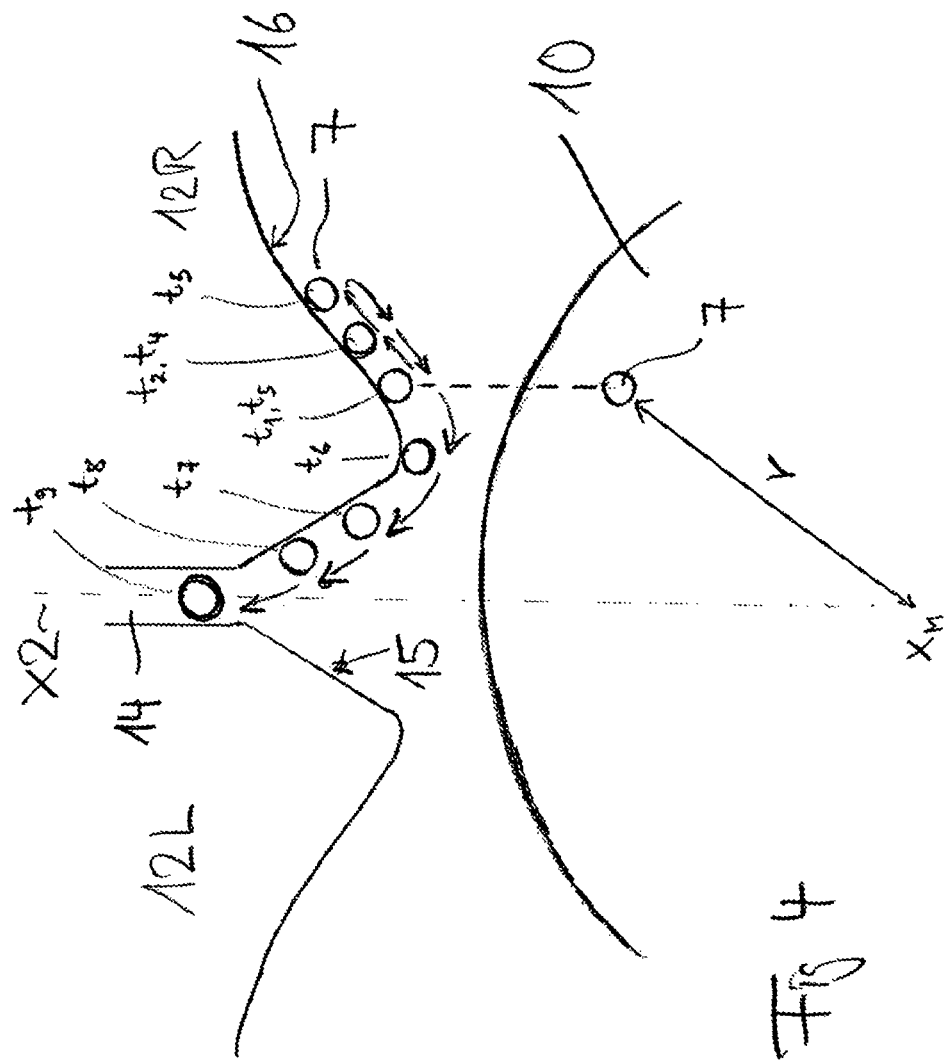
FIG. 4 shows a corresponding combined representation of different stages with a different initial position of the tool.

FIG. 4 illustrates the course of movement again for a starting situation where the chamfering tool 10, after a machining operation, has coasted to a rest position where the pin 7, as shown in projection in FIG. 4, is still in the wing-shaped contour section 16, but positioned between the template and the center of rotation $X_M$. The pin 7, meeting with this contour section at the time $t_1$, is in this case guided outward along the contour (time $t_2$). At the time $t_3$ the center of rotation $X_M$ and the pin 7 are at the same height and, as shown, the pin 7 now returns along the contour section 16, enters into the funnel-shaped section 15 at the time $t_6$, and continues between $t_6$ and $t_9$ to move into the slot 14. In the course of this movement, the chamfering tool 10 turns clockwise and ends up in the same position as shown in FIG. 3*d*, with the sector 6*a* aligned for the initial engagement with the next workpiece 2.

Figure 5:
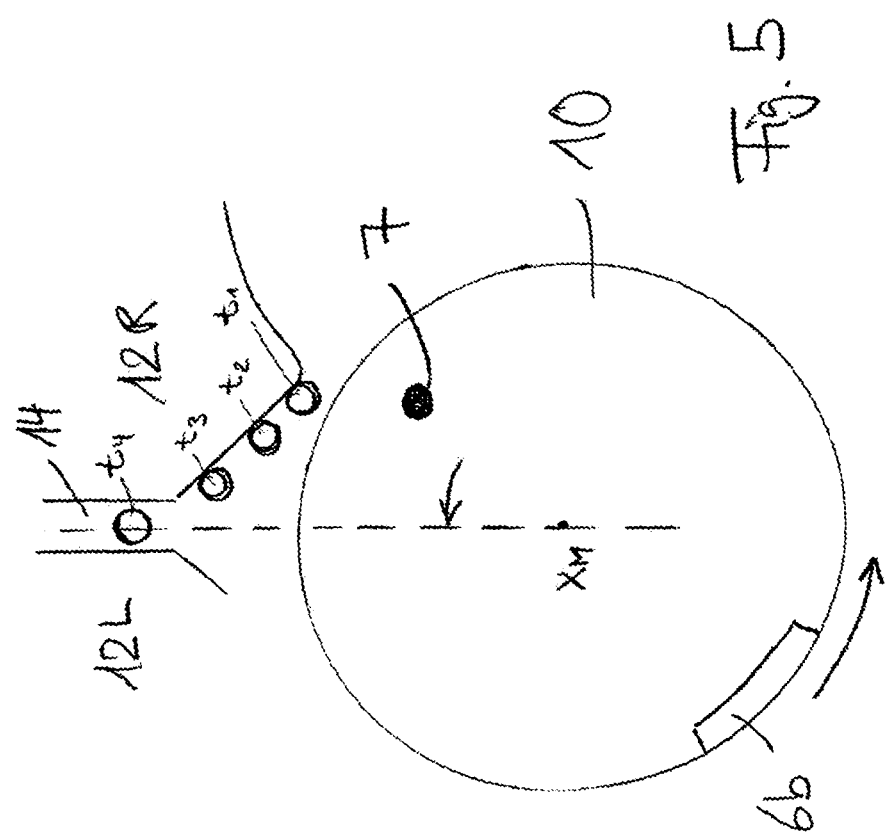
FIG. 5 shows a corresponding combined representation of different stages, with yet another different initial position of the tool.

FIG. 5 shows a situation where the chamfering tool 10 has coasted to a rest position where the pin 7, as shown in projection, is already positioned in the area of the funnel-shaped section 15 of the template 12. The result is in this case a counterclockwise rotation of the chamfering tool 10, so that its end position at the turning point of the movement along the X2-axis is no longer the same as the end position shown in FIG. 3*d*. Instead, the chamfering tool 10 is turned by 180° relative to its position in FIG. 3*d*. However, due to the symmetry between the sectors 6*a* and 6*b* relative to a 180° rotation, the other of the two sectors, i.e. the sector 6*b* which is likewise configured for the initial machining engagement, is brought into initial engagement with the next workpiece 2.

In a very basic configuration, the pin 7 could be simply a rod. However, a two-component configuration is preferred, with a sleeve that is rotatable on a central shaft.

In regard to the design of the template 12, the invention is likewise not limited to the contour shapes which have been shown so far for the inventive feature of the coupling device that has no moving parts. For example, instead of the wing-like section 16, one could also choose a further linear section which could for example also run parallel to the Y-axis. The corresponding guide surfaces 15, 16 could be straight or curved. It is also generally conceivable to represent the projection of the guide surface onto the X2/Y-plane as a function X2(Y)=f(Y). The rotary position of the chamfering tool 10 as a function of time is in this case obtained from the implicit relationship $$X_M(t)+r\cdot\sin\phi(t)-f\{r\cdot\cos\phi(t)\}=0,$$

which leads to a transcendental equation whose solution, however, does not have to be determined because, for the coupling device and the orientation of the tool region that is designed for the initial engagement to function properly, the relevant factor is the end position which is reached as a result (FIG. 3d), not the movement of the chamfering tool 10 that leads to it. It is only important in the case of an extremum d/dY f(Y)=0 (as in FIG. 3 at Y=$\Delta_1$/2) that the ramp in the outer section 16 be not designed too steep, which could cause the pin 7 to jam.

Not shown in the drawing Figures is the design of the opposite end of the slot 14. This area could be configured as another funnel-shaped section with exactly the same function as the funnel-shaped section 15. Thus it is possible in case of a tool change to automatically ensure the correct rotary orientation of the new tool for the machining of the first workpiece after installation.

Figure 6:
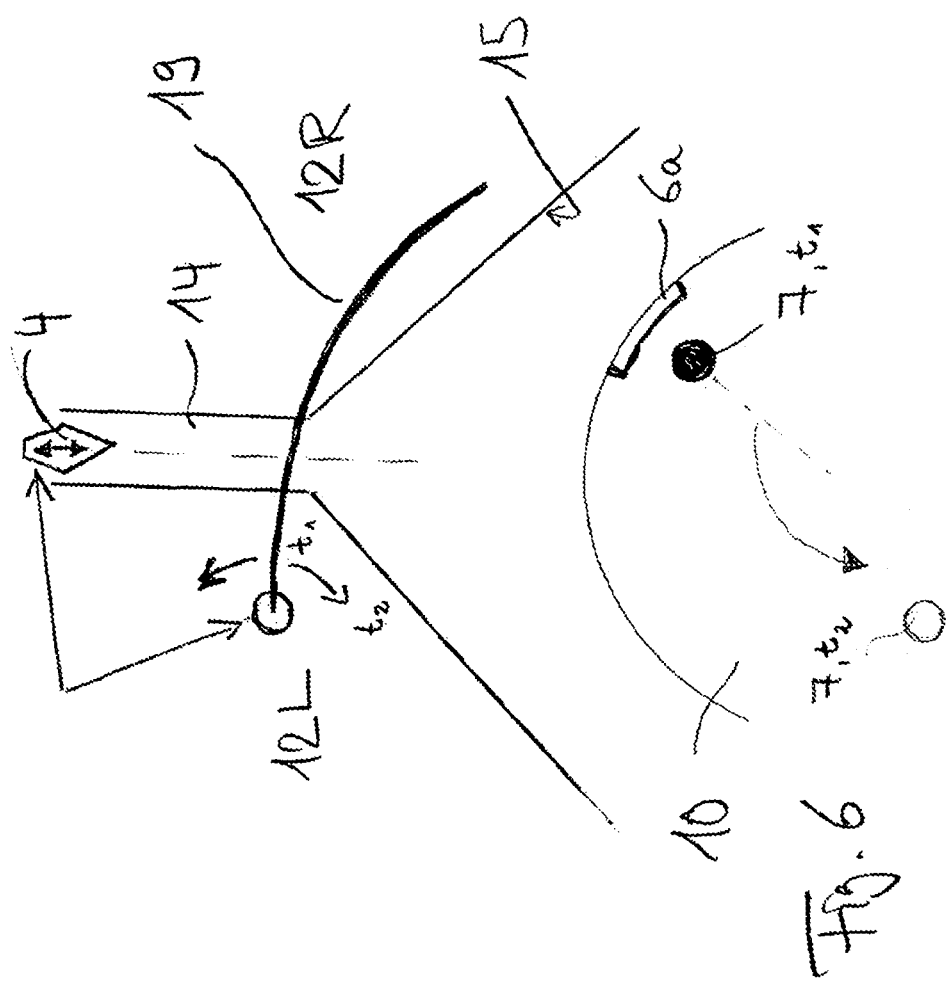
FIG. 6 is a schematic representation of a further embodiment of the coupling.

FIG. 6 schematically represents yet another example of an embodiment wherein the halves 12L and 12R of the template are shaped somewhat differently and which includes an additional movable element 19. The latter is coupled to the motion of the movement mechanism 4 and, in synchronism with the latter, ensures that in case the pin 7 happens to be between the template 12 and the center of rotation $X_M$ after the chamfering tool has coasted to rest, the pin 7 is pushed by a force which turns the chamfering tool 10 far enough that the center of rotation $X_M$ is positioned between the pin and the template. Furthermore, the sweeper-like movement element 19 allows free access of the pin to the template 12, so that in any case the sector 6a in which the pin 7 is arranged becomes the sector for the initial tool engagement in the machining of the new workpiece 2, in accordance with the situation illustrated in FIG. 3d. This embodiment simplifies the design of the tool, as the second sector 6b can be dispensed with, since the situation illustrated in FIG. 5 can no longer occur.

Instead of the one moveable element shown in FIG. 6, one could also provide two elements whose movement paths cross each other scissor-like, in order to achieve a suitable pre-positioning of the chamfering tool. With proper coordination of their shapes and movements, these elements acting in the manner of scissors could also be used for the entire positioning process, in which case the templates might possibly become unnecessary.

The invention is further not limited to the illustrated pairing of a pin and a template, but could also be realized through other coupling mechanisms. However, due to the undefined rotary position of the chamfering tool 10 after coasting to rest, it may be necessary to use a sensor to detect the rotary position, and the stationary side of the coupling mechanism may have to include movable parts in order to match the length/time of the coupling engagement to the desired end position.

The sectors 6a, 6b shown in FIGS. 2a and 3a with the tool regions designed for the initial engagement could enclose angles of about 20° to 30° and include for example two to three teeth. However, instead of an entire sector one could also provide an engagement tooth or a tooth gap for the initial engagement, where the move into engagement would be performed with point-positioning of the tool and with the workpiece standing still or turning very slowly.

Besides, the scope of invention is not limited to the examples of embodiments presented in the description of the drawings. Rather, the features set forth in the description and in the following claims, used individually or in combination, can be essential for the realization of the invention in its different embodiments.

FIGS. 1', 2a', 2b', 3a'-3d', 4' 5' and 6' essentially repeat in a graphically clearer representation the content of FIGS. 1, 2a, 2b, 3a-3d, 4 5 and 6. However, the rotary angle in the starting position of FIGS. 2a', 2b', 3a'-3d' corresponds more closely to the starting position in FIG. 4 and FIG. 4', while the pin 7 in FIGS. 2a, 2b, 3a-3d is already in the starting position between $X_M$ and the workpiece rather than between $X_M$ and the template 12.

The invention claimed is:

1. Method for the machining of toothed workpieces (2) for generating a chamfer on the tooth edges at the ends of the teeth, through a meshing tooth engagement with a chamfering tool (10) that is rotatable with free-running mobility about its axis of rotation (Z2), wherein between the machining of one workpiece and the next, the tool is caused to perform a traverse movement,
   characterized in that the tool is caused to perform a rotary movement whereby, when a tool region (6a, 6b) that is designed for the initial engagement with the work pieces is not suitably positioned, it is brought into a position that is suitable for the machining of the next work piece,
   wherein the rotary movement is effected by a coupling engagement comprising a relative displacement movement between the tool (10) and a counterpart that is configured as a guide arrangement, and
   wherein the rotary movement is dependent at least in sections on the traverse movement.

2. Method according to claim 1, wherein the traverse movement takes place along a closed-loop path.

3. Method according to claim 2, wherein the coupling engagement takes place before a turning point of the closed-loop path.

4. Method according to claim 1 wherein the coupling engagement is mechanical.

5. Method according to claim 1 wherein the coupling engagement is carried out with a coupling device comprising the guide arrangement being a stationary template that does not belong to the tool and has no movable parts.

6. Method according to claim 5 wherein for the move into said initial engagement, a coupling part (7) on the tool is guided by the stationary template of the coupling device.

7. Method according to claim 1 wherein the tool region that is designed for the initial engagement is not continuous and comprises two sub-regions (6a, 6b) that are offset against each other at two diametrically opposite locations.

8. Method according to claim 1 wherein the tool region/sub-region designed for the initial engagement comprises a plurality of gear teeth.

9. Method according to claim 1 wherein the workpiece is rotating during the initial engagement with a velocity in the area of engagement no higher than 360 m/min and at least 5 m/min.

10. Method according to claim 1 wherein the tool region/sub-region designed for the initial engagement comprises only one tooth or a tooth gap.

11. Method according to claim 10, wherein the workpiece is set into rotation only after the region designed for the initial engagement has been brought into meshing engagement with the teeth of the workpiece.

12. Method according to claim 1 wherein a coupling part (7) belonging to the tool, when not lying closer to the workpiece axis than a plane that is orthogonal to the path of the traverse movement and contains or intersects the tool axis, is moved there automatically and also by purely mechanical means.

13. Method according to claim 1 wherein for a part of the possible angular starting positions of the tool, a reversal of direction takes place in a movement component of the coupling part (7) that belongs to the tool, said movement component being directed at a right angle to the path of the traverse movement.

* * * * *